(12) United States Patent
Morigami

(10) Patent No.: US 11,167,953 B2
(45) Date of Patent: Nov. 9, 2021

(54) PASSENGER CONVEYOR

(71) Applicant: Mitsubishi Electric Corporation, Tokyo (JP)

(72) Inventor: Atsushi Morigami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 213 days.

(21) Appl. No.: 16/608,206

(22) PCT Filed: Jun. 9, 2017

(86) PCT No.: PCT/JP2017/021476
§ 371 (c)(1),
(2) Date: Oct. 25, 2019

(87) PCT Pub. No.: WO2018/225247
PCT Pub. Date: Dec. 13, 2018

(65) Prior Publication Data
US 2021/0284488 A1  Sep. 16, 2021

(51) Int. Cl.
| | |
|---|---|
| *B66B 1/30* | (2006.01) |
| *B66B 25/00* | (2006.01) |
| *H02J 7/00* | (2006.01) |
| *H02M 5/458* | (2006.01) |
| *H02M 1/14* | (2006.01) |

(52) U.S. Cl.
CPC .............. *B66B 1/306* (2013.01); *B66B 25/00* (2013.01); *H02J 7/0068* (2013.01); *H02M 1/143* (2013.01); *H02M 5/458* (2013.01)

(58) Field of Classification Search
CPC ...... H02M 5/458; H02M 1/143; H02J 7/0068; B66B 25/00; B66B 1/306
See application file for complete search history.

(56) References Cited

U.S. PATENT DOCUMENTS

| | | | | |
|---|---|---|---|---|
| 5,107,975 A | * | 4/1992 | Iwata | B66B 29/02 |
| | | | | 198/323 |
| 2010/0079093 A1 | * | 4/2010 | Kitanaka | H02H 7/0838 |
| | | | | 318/400.3 |
| 2019/0084793 A1 | * | 3/2019 | Nakari | G05B 19/048 |

FOREIGN PATENT DOCUMENTS

| | | |
|---|---|---|
| JP | 10-157963 A | 6/1998 |
| JP | 2006-151545 A | 6/2006 |
| JP | 2006-182456 A | 7/2006 |

OTHER PUBLICATIONS

International Search Report and Written Opinion dated Sep. 5, 2017 for PCT/JP2017/021476 filed on Jun. 3, 2017, 8 pages including English Translation of the International Search Report.

* cited by examiner

*Primary Examiner* — Patrick C Chen
(74) *Attorney, Agent, or Firm* — Xsensus LLP

(57) ABSTRACT

A power supply circuit of a passenger conveyor converts includes an electrolytic capacitor and a control power supply device configured to supply an electric power to a charging circuit configured to charge the electrolytic capacitor. A storage battery is disposed between a converter and an inverter in parallel with the electrolytic capacitor. When an operation of the passenger conveyor is stopped in response to a key operation, the power supply to the control power supply device is shut off. When the operation of the passenger conveyor is resumed in response to a key operation, a DC electric power charged in the storage battery is supplied to the inverter, to thereby allow the passenger conveyor to resume the operation.

5 Claims, 2 Drawing Sheets

Fig. 2

| No | Mode | Relay A | Relay B | Relay C | Relay D |
|---|---|---|---|---|---|
| 1 | At Power-ON | OFF | OFF | OFF | ON |
| 2 | At Stand-Up by Key Operation After Power-ON | ON | ON | OFF | ON |
| 3 | During Operation State of Passenger Conveyor | ON | ON | ON | ON |
| 4 | During Standby State in Automatic Operation | ON | ON | ON | ON |
| 5 | During Stopped State by Key Operation | OFF | OFF | OFF | OFF |
| 6 | At Restart by Key Operation After Stopped State by Key Operation | ON | OFF | ON | ON |
| 7 | During Maintenace | OFF | OFF | OFF | OFF |

Fig. 3

| No | MODE | Electrolytic Capacitor | Storage Battery |
|---|---|---|---|
| 1 | At Power-ON | Charge | Keeping State |
| 2 | At Stand-Up by Key Operation After Power-ON | Discharge | Keeping State |
| 3 | During Operation State of Passenger Conveyor | Charge | Charge |
| 4 | During Standby State in Automatic Operation | Charge | Charge |
| 5 | During Stopped State by Key Operation | Keeping State | Keeping State |
| 6 | At Restart by Key Operation After Stopped State by Key Operation | Charge | Discharge |
| 7 | During Maintenace | Keeping State | Keeping State |

…

PASSENGER CONVEYOR

CROSS-REFERENCE TO RELATED APPLICATIONS

The present application is based on PCT filing PCT/JP2017/021476, filed Jun. 9, 2017, the entire contents of Which are incorporated herein by reference.

TECHNICAL FIELD

The present invention relates to a passenger conveyor, and more particularly, to a passenger conveyor comprising a power supply circuit, which is configured to cause a converter to convert an AC electric power supplied from a power supply into a DC electric power, and then to cause an inverter to reconvert the DC electric power into an AC electric power.

BACKGROUND ART

Some passenger conveyors of related art comprise a control power supply device, which is configured to supply an electric power to various electric devices, and to a charging circuit to be used for a smoothing electrolytic capacitor disposed between a converter and an inverter (see, for example, Patent Literature 1). The control power supply device is configured to supply an electric power to the charging circuit for the electrolytic capacitor even when an operation of the passenger conveyor is stopped in response to a user's key operation, and to prevent the electrolytic capacitor from being broken by receiving an inrush current that flows when the operation of the passenger conveyor is resumed. However, the electric power is also supplied from the control power supply device to other electric devices that cannot be used when the operation of the passenger conveyor is stopped.

As one approach to saving a standby electric power during the stopped state by the key operation, the power supply to the control power supply device may be shut off. In this case, however, the electrolytic capacitor is discharged, and is required to be recharged when the operation of the passenger conveyor is resumed, leading to an increase of a waiting time until the operation is resumed.

CITATION LIST

Patent Literature

[PTL 1] JP 2006-151545 A

SUMMARY OF INVENTION

Technical Problem

The present invention has been made with a view to solving the above-mentioned problem, and it is therefore an object of the present invention to provide a passenger conveyor capable of saving a standby electric power during a stopped state by a key operation without increasing a waiting time until the operation of the passenger conveyor is resumed.

Solution to Problem

In order to solve the above-mentioned problem, according to the present invention, there is provided a passenger conveyor comprising: a power supply circuit, which is configured to cause a converter to convert an AC electric power supplied from an AC power supply into a DC electric power, and then to cause an inverter to reconvert the DC electric power into an AC electric power; the power supply circuit comprising: a capacitor disposed between the converter and the inverter and configured to smoothen the DC electric power output from the converter; a control power supply device configured to supply an electric power to a charging circuit configured to charge the capacitor when the passenger conveyor is stopped; and wherein a storage battery is disposed between the converter and the inverter in parallel with the capacitor, and wherein, when an operation of the passenger conveyor is stopped in response to a key operation, a power supply from the AC power supply to the control power supply device is shut off, and wherein, when the operation of the passenger conveyor is resumed in response to a key operation, a DC electric power charged in the storage battery is supplied to the inverter, to thereby allow the passenger conveyor to resume the operation.

Advantageous Effects of Invention in the passenger conveyor of the present invention, it is possible to save a standby electric power during a stopped state by a key operation without increasing a waiting time until the operation of the passenger conveyor is resumed.

BRIEF DESCRIPTION OF DRAWINGS

FIG. 2 is a table for showing respective ON/OFF states of each relay A to relay D in correspondence with seven operational modes of the passenger conveyor according to the embodiment.

FIG. 3 is a table for showing states (charging, discharging, and keeping state) of an electrolytic capacitor and a storage battery in correspondence with seven operational modes of the passenger conveyor according to the embodiment.

DESCRIPTION OF EMBODIMENTS

Figure 1:
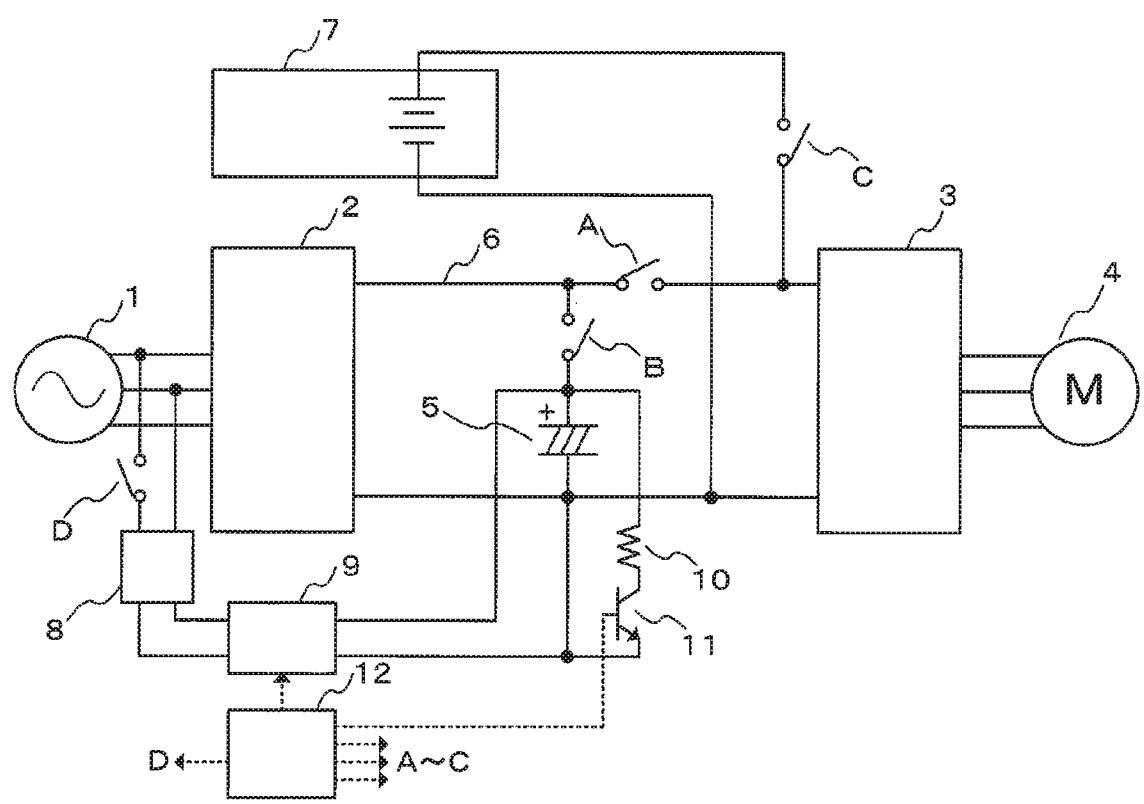
FIG. 1 is a diagram for illustrating a configuration of a power supply circuit of a passenger conveyor according to one embodiment of the present invention.

Now, with reference to accompanying FIG. 1 to FIG. 3, detailed description is made of an embodiment of the present invention. The embodiment described below is one example, and the present invention is not limited to this embodiment.

Embodiment

FIG. 1 is a diagram for illustrating a configuration of a power supply circuit of a passenger conveyor according to an embodiment of the present invention.

The passenger conveyor comprises a three-phase AC power supply 1, a converter 2 configured to convert an AC electric power supplied from the three-phase AC power supply 1 into a DC electric power, an inverter 3 configured to reconvert the DC electric power supplied from the converter 2 into a three-phase AC electric power, and a motor 4 driven by the AC electric power supplied from the inverter 3.

An electrolytic capacitor 5 is connected between the output of the converter 2 and the input of the inverter 3 so as to smoothen the DC electric power output from the converter 2. A first relay A is disposed in the middle of a line 6 connecting the converter 2 and the inverter 3. A second relay B is disposed between the line 6 and the positive electrode of the electrolytic capacitor Further, a storage battery 7 is connected between the output of the converter 2 and the input of the inverter 3 in parallel with the electrolytic capacitor 5. A third relay C is disposed between the line 6 and the positive electrode of the storage battery Further, the passenger conveyor comprises a control power supply device 8 configured to operate with use of the electric power supplied from the three-phase AC power supply 1, a fourth relay D disposed between the three-phase AC power supply 1 and the control power supply device 6, and a charging circuit 9 configured to operate with use of an electric power supplied from the control power supply device 8 and configured to charge the electrolytic capacitor 5.

Further, the passenger conveyor comprises a discharge resistor 10 configured to forcedly discharge the electrolytic capacitor 5, and a transistor 11 serving as a switch used to switch a charging mode and a discharging mode of the electrolytic capacitor 5. The relays A to D and the transistor 11 are controlled to be ON/OFF by a control circuit 12.

Next, a description is given of an operation of the power supply circuit of the passenger conveyor according to the embodiment of the present invention.

FIG. 2 is a table for showing respective ON/OFF states of each relay A to relay D in correspondence with seven operational modes of the passenger conveyor according to the present invention. FIG. 3 is a table for showing states (charging, discharging, and keeping state) of the electrolytic capacitor 5 and the storage battery 7 in correspondence with seven operational modes of the passenger conveyor.

1. At Power-On

When a user powers up the passenger conveyor, the control circuit 12 turns on the relay D alone, and turns off the other relays B to C. With this operation, an AC electric power is supplied from the three-phase AC power supply 1 to the control power supply device 8, to thereby allow the charging circuit 9 to operate and start charging the electrolytic capacitor 5.

After the completion of charging of the electrolytic capacitor 5, the passenger conveyor is ready to operate. At this time, in principle, the storage battery 7 may be charged by the charging circuit 9. However, if the charging circuit 9 charges the storage battery 7, the passenger conveyor takes longer time to become ready for operation. Thus, in this example, charging of the storage battery 7 by the charging circuit 9 is not performed.

2. At Startup by Key Operation After Power-On

After the charging of the electrolytic capacitor 5 is completed, when the passenger conveyor is started up in response to a user s key operation, the control circuit 12 turns on the relay A, the relay B, and the relay D, and turns off the relay C. With this operation, the DC electric power charged in the electrolytic capacitor 5 is supplied to the inverter 3 and converted into an AC electric power, and the motor 4 is driven by this AC electric power, to thereby allow the passenger conveyor to start operating.

3. During Operation of the Passenger Conveyor

After the passenger conveyor starts operating, when the speed of the passenger conveyor is reached to a certain speed, the control circuit 12 turns on all the relays A to D. With this operation, the passenger conveyor operates with use of an electric power supplied from the three-phase AC power supply 1 via the converter 2 and the inverter 3, and the electrolytic capacitor 5 and the storage battery 7 are also charged with a DC electric power supplied from the converter 2.

4. During Standby State in Automatic Operation

When a passenger has not detected for a predetermined time during an operation, the passenger conveyor stays in a standby state while moving at low speed or being stopped, until the conveyor detects a passenger. During the standby state of the passenger conveyor, the control circuit 12 keeps the relay D turned on because the control power supply device 8 is required as a power supply for a passenger detecting sensor, irrespective of whether the passenger conveyor is moving at a low speed or is stopped during standby state.

Further, the control circuit 12 also keeps the relay A, the relay B, and the relay C turned on so as to charge the electrolytic capacitor 5 and the storage battery 7. Those ON states of the relays A to D are kept on even after the operation is resumed in response to detection of a passenger during the standby state.

5. During Stopped State by Key Operation

When the operation of the passenger conveyor is stopped in response to a user's key operation, the control circuit 12 turns off the relay D so as to interrupt the power supply to the control power supply device 8. With this operation, the charging of the electrolytic capacitor 5, which is performed by the charging circuit 9, is cancelled, to thereby save a standby power. Further, the control circuit 12 turns off the transistor 11 so as not to forcedly discharge the electrolytic capacitor 5.

The control circuit 12 turns off the relay A, the relay B, and the relay C so as to prevent self-discharges of the electrolytic capacitor 5 and the storage battery 7. Note that, if all power supplies are turned off, a log of events that may occur during the stopped state of the passenger conveyor cannot be obtained. In order to avoid such a situation, a CPU power supply (not shown) mounted on a control board is not turned off.

6. At Restart State by Key Operation After Stopped State by Key Operation

When the passenger conveyor stops in response to a user's key operation and then restarts in response to the user's operation, the control circuit 12 turns on the relay A and the relay C. With this operation, the DC electric power charged in the storage battery 7 is supplied to the inverter 3 and then converted into an AC electric power, the motor 4 is driven by this AC electric power to thereby allow the passenger conveyor to resume its operation. Specifically, the passenger conveyor resumes the operation with use of the electric power of the storage battery 7. Note that, if the storage battery 7 is not charged enough for the passenger conveyor to operate, the passenger conveyor remains unmoved until the charging of the electrolytic capacitor 5, which is described next, is completed.

The control circuit 12 turns on the relay D while keeping a turned off state of the relay B. With this operation, an AC electric power is supplied from the three-phase AC power supply 1 to the control power supply device 8 to allow the charging circuit 9 to operate and charge the electrolytic capacitor 5.

7. During Maintenance

When electric parts are adjusted during maintenance of the passenger conveyor, the three-phase AC power supply 1 is required to be shut off for safety purposes. However, if only mechanical parts are to be adjusted, the three-phase AC power supply 1 is not necessarily required to be shut off In this case, safety can be ensured by completely stopping the passenger conveyor. For that purpose, the control circuit 12 turns off all the relays A to D. Moreover, the control circuit 12 also turns off the transistor 11. As a result, the power supply to the inverter 3 and the control power supply device 8 is shut off, and self-discharges of the electrolytic capacitor 5 and the storage battery 7 are also prevented.

In the related-art technologies, the three-phase AC power supply 1 is shut off and turned on again even during adjustment of mechanical parts, and hence the electrolytic capacitor 5 is required to be recharged each time the three-phase AC power supply 1 is turned on again. In contrast, according to the present invention, a time for recharging the electrolytic capacitor 5 can be saved, and hence the maintenance time can be reduced.

Conclusion

As described above, in the passenger conveyor of the present invention, the storage battery 7 is connected between the converter 2 and the inverter 3 in parallel with the smoothing electrolytic capacitor 5. In this configuration, when the operation of the passenger conveyor is stopped in response to a key operation, the power supply to the control power supply device 8 is shut off. Further, when the operation of the passenger conveyor is resumed in response to a key operation, a DC electric power charged in the storage battery 7 is supplied to the inverter 3, to thereby allow the passenger conveyor to resume its operation. Hence, the standby electric power during the stopped state by the key operation can be saved without increasing a waiting time until the operation resumes.

Further, during maintenance of the passenger conveyor, power supply from the three-phase AC power supply 1 to the in 3 and the control power supply device 8 is shut off, and at this time, the electrolytic capacitor 5 is kept a state of being charged. With this operation, the maintenance time can be reduced.

The invention claimed is:

1. A passenger conveyor comprising a power supply circuit, which is configured to cause a converter to convert an AC electric power supplied from an AC power supply into a DC electric power, and then to cause an inverter to reconvert the DC electric power into an AC electric power, the power supply circuit comprising:

a capacitor disposed between the converter and the inverter and configured to smoothen the DC electric power output from the converter, and a control power supply circuit to supply an electric power to a charging circuit configured to charge the capacitor when the passenger conveyor is stopped; and wherein a storage battery is disposed between the converter and the inverter in parallel with the capacitor, and wherein, when an operation of the passenger conveyor is stopped in response to a stop key operation, a power supply from the AC power supply to the control power supply circuit is shut off, and wherein, when the operation of the passenger conveyor is resumed in response to a resume key operation, a DC electric power charged in the storage battery is supplied to the inverter, to thereby allow the passenger conveyor to resume the operation.

2. The passenger conveyor according to claim 1; wherein, when the operation of the passenger conveyor is stopped in response to a stop key operation, a connection between the capacitor and the inverter is shut off and a connection between the storage battery and the inverter is shut off.

3. The passenger conveyor according to claim 1, wherein during the operation of the passenger conveyor, the capacitor and the storage battery are charged by the converter.

4. The passenger conveyor according claim 1, wherein, during maintenance of the passenger conveyor, power supplies from the AC power supply to the inverter and the control power supply circuit are shut off.

5. The passenger conveyor according to claim 4, wherein, during the maintenance of the passenger conveyor, a connection between the capacitor and the inverter is shut off and a connection between the storage battery and the inverter is shut off.

* * * * *